Patented Jan. 14, 1930

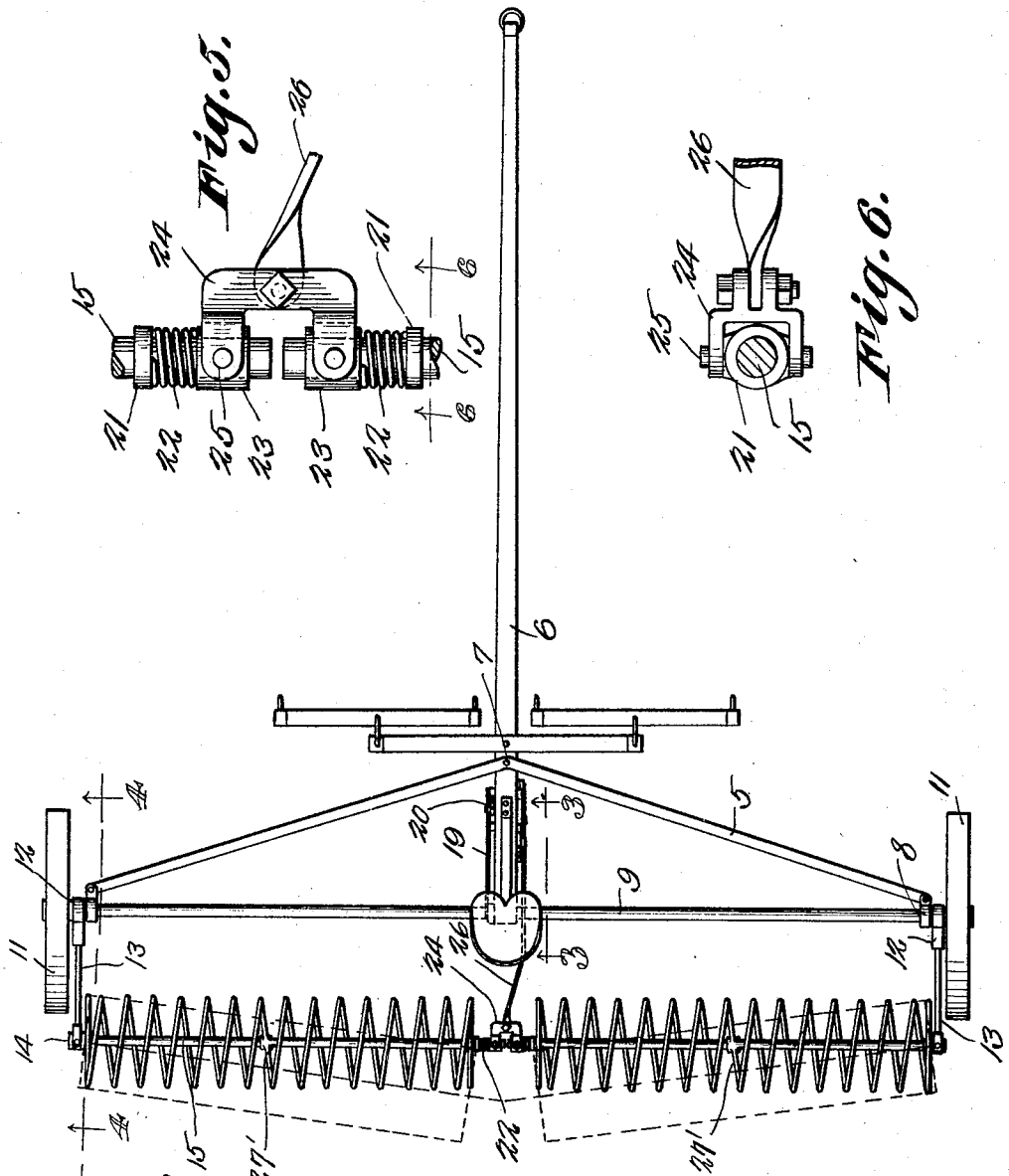

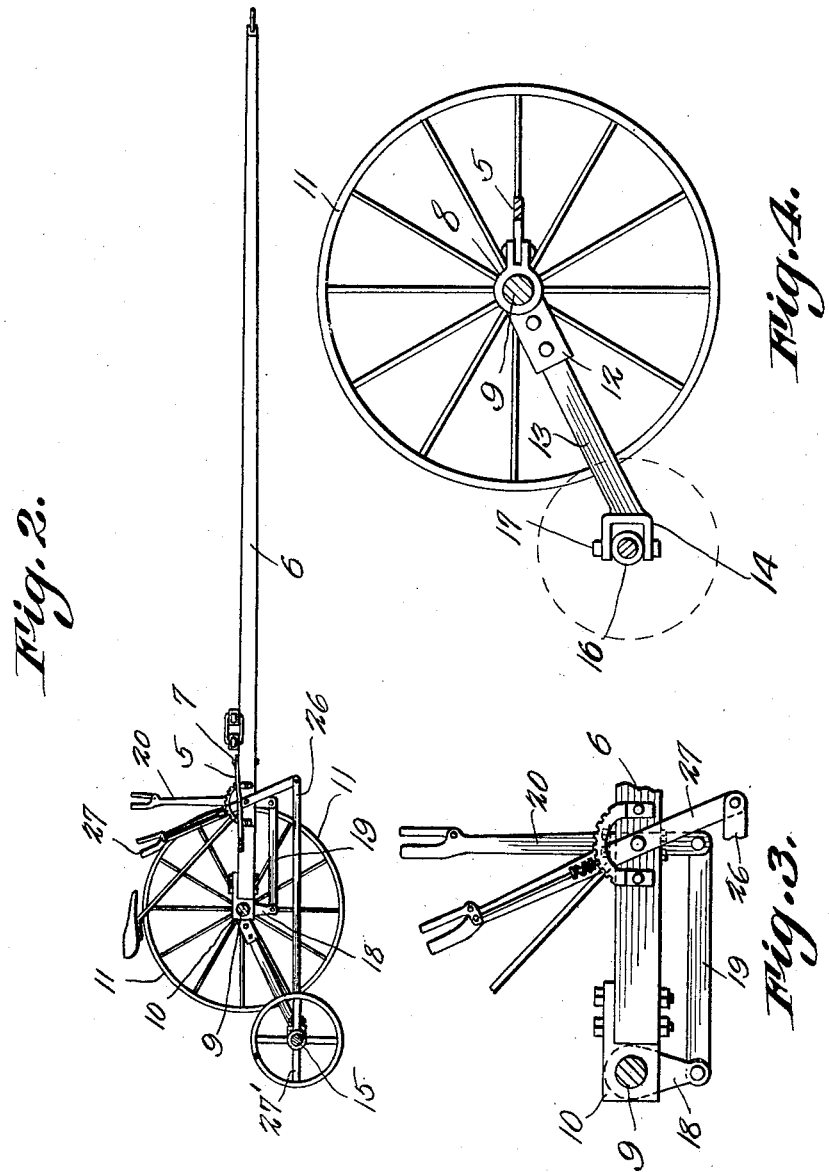

1,743,151

UNITED STATES PATENT OFFICE

CHARLES MALEPSY, OF EATON RAPIDS, MICHIGAN, ASSIGNOR TO ANTHONY LIENHART, OF STOCKBRIDGE, MICHIGAN

AGRICULTURAL MACHINE

Refiled for abandoned application Serial No. 172,721, filed March 4, 1927. This application filed April 27, 1929. Serial No. 358,714.

The present invention has reference to agricultural machines, and more particularly to a wheel supported weeder especially designed for use in weeding soil in which peppermint in growing, the construction of the weeder being such as to insure against damaging the roots of the peppermint plants.

Another important object of the invention is to provide a device of this character which will operate efficiently over mucky soil and will act to remove weeds without cutting into the soil.

A further object of the invention is to provide a device of this character embodying a pair of adjustable weeders, novel means being provided whereby the operator may readily and easily adjust the weeders vertically with respect to the ground surface, or with respect to each other.
With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.
Referring to the drawings:

Figure 1 is a plan view of an agricultural machine constructed in accordance with the invention.

Figure 2 is a side elevational view thereof.
Figure 3 is an enlarged detail view illustrating the control levers, on line 3—3 of Figure 1.

Figure 4 is a sectional view taken on line 4—4 of Figure 1.
Figure 5 is an enlarged detail view of the connection between the weeders of the machine.

Figure 6 is a sectional view taken on line 6—6 of Figure 5.
Referring to the drawings in detail, the device includes a frame embodying bars 5 which are connected to the tongue 6 at 7, the outer ends of the bars 5 being connected with the collars 8 that are mounted on the axle 9 at points adjacent to the ends thereof.

As illustrated, the inner end of the tongue is provided with a bearing 10 through which the axle 9 extends in such a way that rotary movement of the axle will be permitted.

On the outer ends of the axle are wheels 11 by means of which the device is supported and moved over the ground surface. Adjacent to the collars 8 and secured to the axle 9 are arms 12 to which the rods 13 are secured, the rods 13 being supplied with yokes 14 at their outer ends that are connected with the outer ends of the shafts 15 through the medium of the collars 16 and bolts 17. Thus it will be seen that due to this construction the weeders may rotate with their shafts.

Secured to the central portion of the axle 9 is a depending arm 18 to which the link 19 is connected, the link also having connection with the lever 20 secured to the tongue 6 so, that movement of the lever 20 will result in a relative movement of the axle 9 to rotate the same and raise or lower the weeders.

Adjacent to the inner ends of the shafts 15 are secured collars 21 that act as stops for the outer ends of the coiled springs 22, the inner ends thereof being connected with the slidable sleeves 23 which are connected with the bar 24, as at 25, the connection being such as to permit the sleeves 23 to slide on the shafts and allowing an adjustment of the inner ends of the shafts as indicated by dotted lines in Figure 1 of the drawings.

Pivotally connected with the bar 24 is a link 26 that has its forward end connected with the lever 27, to the end that as the lever is moved forwardly or rearwardly, the inner end of the shaft 15, may be adjusted to change the angles at which the shafts and weeders, operate.

The weeders also include rods spirally formed as clearly shown by Figure 1 of the drawings, the same having their ends connected to the shafts, so that weeders are provided on the shafts to rotate therewith.

From the foregoing it will be seen that due to the fact that these weeders are constructed of rods, spirally formed, they will not cut into the ground surface, but will move over the surface removing weeds which come up through the planted soil.

It will further be seen that due to the construction shown and described, the inner ends of the spirally formed weeders may be adjusted towards or away from the main axle 9 so that the weeders will have a shearing action to the end that they will efficiently cut larger weeds.

Intermediate the ends of each weeder is a brace 27' to brace the weeders at their central portions.

The coils are of uniform diameter and of substantial pitch, and the blades are formed of round cross section. The blades are preferably formed of round rods bent into the coils and when mounted on the shafts constitute rotating soil working units. These units, through the mounting described, are supported for angular adjustment relative to each other and relative to the line of draft.

The implement is especially designed and desirable as a weeder, that is, it is designed to pass over the young plants which are firmly rooted, but will destroy the young weeds as it moves the entire surface of the ground with a scuffing or sliding movement, passing over the young plants, however, without injury thereto.

The structure also has the advantage of loosening the surface leaving it smooth and covered with a finely worked mulching surface.

Having thus described my invention, what I claim as new and desire to secure by Letters Patent, is:

1. A weeder of the class described including an axle, wheels on the axle, rods extending rearwardly from the axle, collars on the free ends of the rods, horizontal shafts pivotally mounted in the collars, stationary collars on the inner ends of the horizontal shafts, movable sleeves on the inner ends of the shafts, coiled springs mounted between the last mentioned collars and sleeves, a bar pivotally connected with the sleeves, means for moving the bar to adjust the inner ends of the shafts, said sleeves adapted to slide over the shafts to permit of adjustment of the shafts, and harrowing members on the shafts.

2. In an implement of the class described, the combination of a main frame, a pair of axles mounted on said frame for angular adjustment relative to each other and relative to the line of draft, and spirally coiled rotating blades of substantial length and of round cross section carried by said axles, the coils of the blades being of uniform diameter and of substantial pitch.

3. An implement of the class described, the combination of a main frame, and a plurality of rotating soil working units mounted on said frame for angular adjustment relative to each other and to the line of draft, and each including a spirally coiled blade of substantial length and of round cross section, the coils being of substantially uniform pitch and diameter.

In witness whereof I have hereunto set my hand.

CHARLES MALEPSY.